March 22, 1960  L. BELGARDE  2,929,506
COMBINED FULL-FLOW AND PART-FLOW OIL FILTERS
Filed June 19, 1958  4 Sheets-Sheet 1

INVENTOR.
LEO BELGARDE
BY
Charles E. Wilson
ATTORNEY

INVENTOR.
LEO BELGARDE
BY
Charles B. Willson
ATTORNEY

INVENTOR.
LEO BELGARDE
BY
Charles C. Willson
ATTORNEY

March 22, 1960     L. BELGARDE     2,929,506
COMBINED FULL-FLOW AND PART-FLOW OIL FILTERS
Filed June 19, 1958     4 Sheets-Sheet 4

INVENTOR.
LEO BELGARDE
BY
Charles C. Willson
ATTORNEY

2,929,506
Patented Mar. 22, 1960

2,929,506

COMBINED FULL-FLOW AND PART-FLOW OIL FILTERS

Leo Belgarde, Pawtucket, R.I., assignor to Fram Corporation, Providence, R.I., a corporation Application June 19, 1958, Serial No. 743,056

1 Claim. (Cl. 210—315)

This invention relates to an oil filter having both a full-flow and a part-flow filter cartridge in the same filter shell. The present filter is designed primarily to filter oil supplied to the bearings of an internal combustion engine but can be used for other purposes.

The importance of filtering the oil that is pumped from the oil sump to the bearings of an internal combustion engine is well recognized. Two types of filters are in common use for this purpose. One is known as the part-flow or by-pass filter, and the other is known as the full-flow filter. The full-flow filter is so constructed that under normal conditions all of the oil needed to lubricate the engine bearings is passed through this filter before it reaches such bearings. This construction has the advantage that all large contaminant particles are removed from the oil stream before they can reach the engine bearings. The disadvantage of this type of filter is that it will not remove the very fine contaminants from the oil stream.

The construction of the part-flow or by-pass filter is such that it does a very efficient filtering job and removes foreign particles down to a few microns in size, but the oil flows through this filter too slowly to meet the requirements of the engine bearings. Therefore, it is the usual practice to supply this part-flow filter with only a small part of the oil delivered by the engine pump and to return the oil that passes through this filter directly to the crankcase. In this case oil is pumped directly from the crankcase to the engine bearings without going through a filter, but eventually all of the oil will be passed through the part-flow filter.

The present invention, as above stated, combines a full-flow and a part-flow cartridge in a single housing, with the advantages that under normal conditions all of the oil reaching the engine bearings will have passed through the full-flow filter cartridge on its way to the bearings, and all of the oil in the crankcase will be eventually filtered by the part-flow cartridge to remove all contaminants larger than a few microns in size.

Combined full-flow and part-flow oil filters have been used heretofore, but the present invention provides a number of desirable features whereby a thoroughly reliable filter that is easy to service is provided.

One feature of the present invention resides in the arrangement of the part-flow and full-flow filter cartridges whereby the former is disposed inside the latter to conserve space, and both cartridges are readily positioned concentrically about the center tube. Also, in this construction both cartridges are readily secured in sealing engagement with their associated parts to insure the proper action of each cartridge.

A more specific feature of the invention resides in the construction whereby both cartridges surround a center tube and rest upon a bottom plate that is spaced from the bottom of the filter shell, and each filter cartridge sealingly engages this bottom plate and is held in its operating position by a retainer that threadedly engages the upper portion of the center tube.

Another feature resides in means for accurately centering the part-flow cartridge about the center tube and the full-flow cartridge upon its supporting base as it is moved to its operating position.

Still another feature resides in the construction whereby both filter cartridges may be readily removed when dirty and replaced with new cartridges, and this can be done largely by hand without the use of any special tool.

The above and other features of the present invention will be further understood from the following description when read in connection with the accompanying drawings, wherein.

Figure 1:
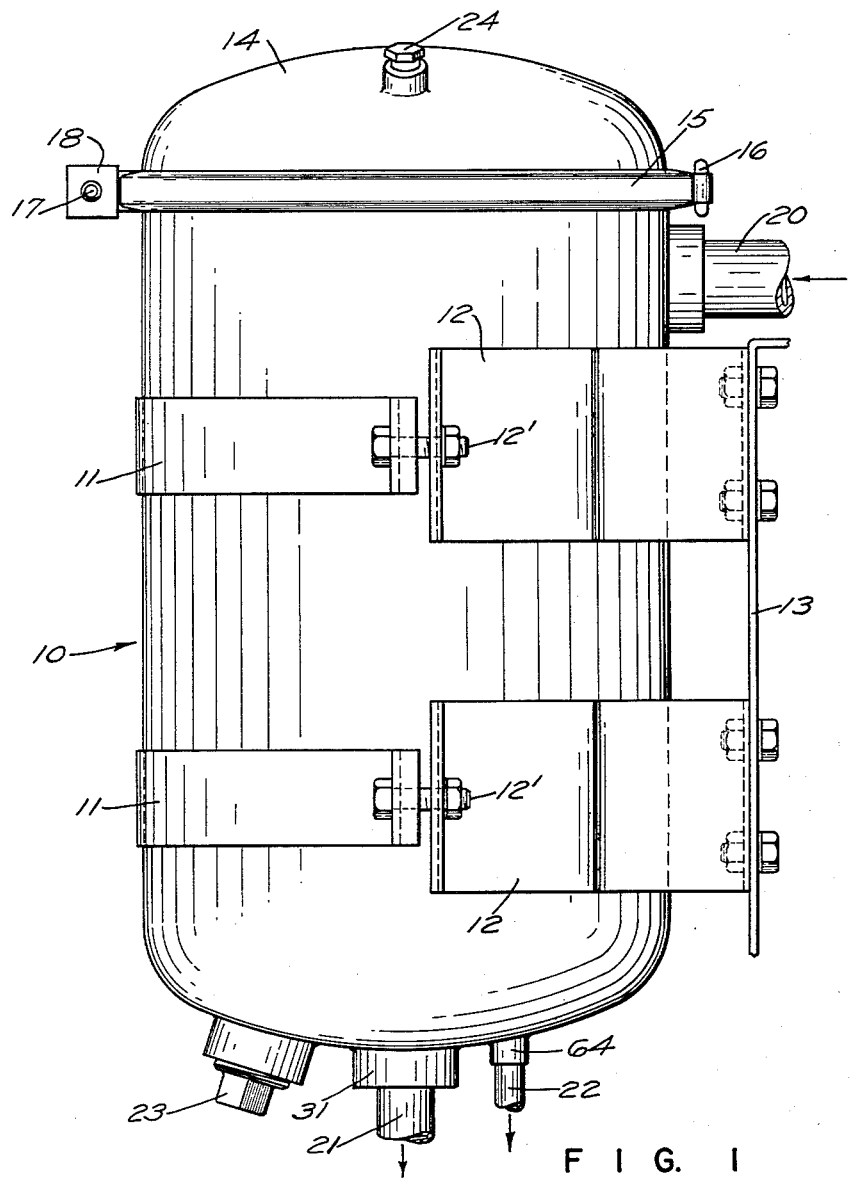
Fig. 1 is a side elevation of an oil filter embodying the features of the present invention and shown as clamped in its operating position.
Figure 4:
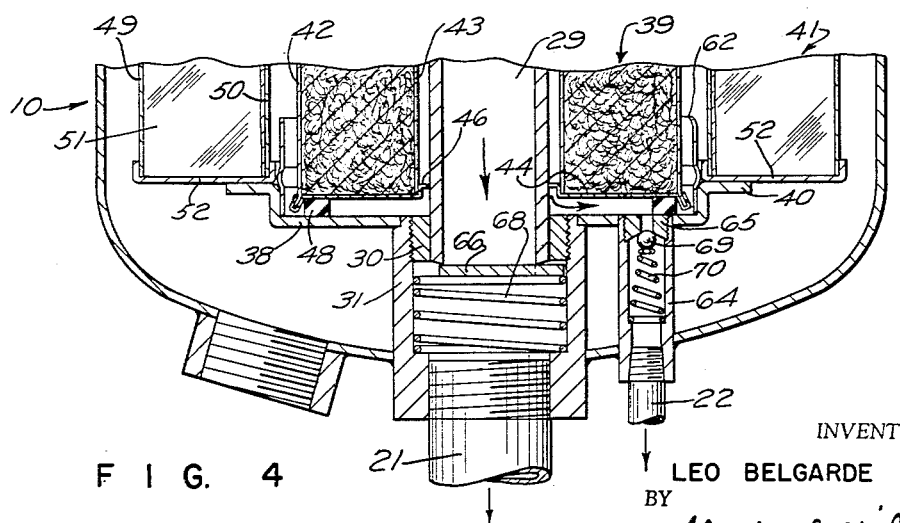
Figure 5:
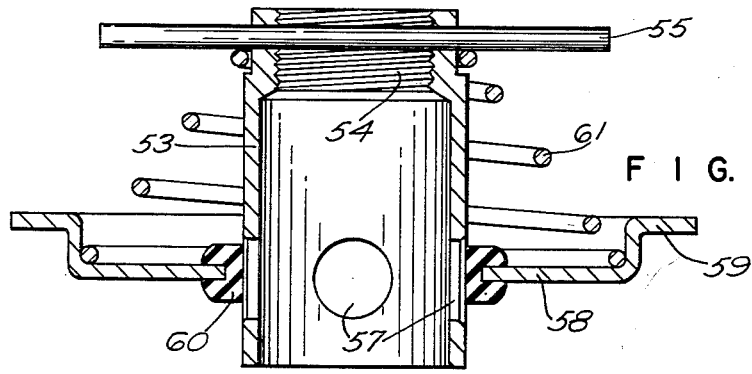
Figure 6:
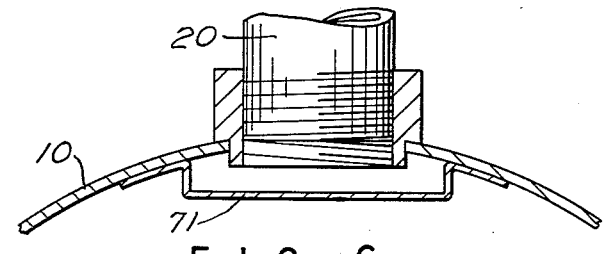
Figure 7:
Figure 8:
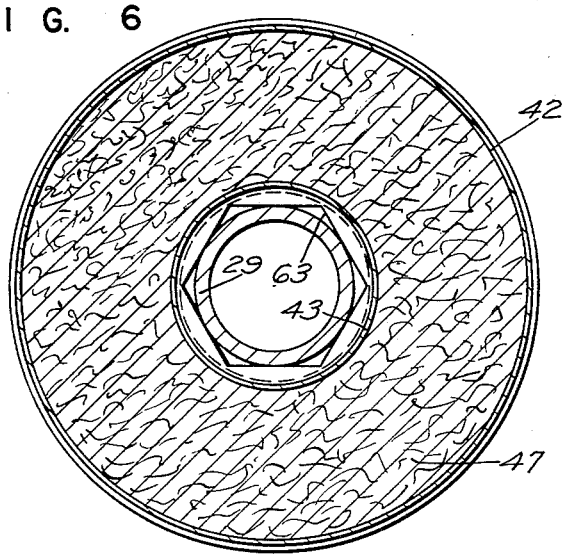
Figure 9:
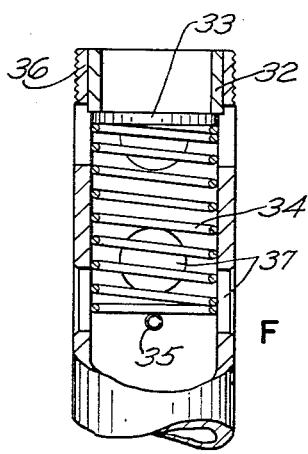

Fig. 4, on a larger scale, is a vertical sectional view through the lower portion of the filter of Fig. 1;

Fig. 5 is an enlarged vertical sectional view through the retainer assembly at the upper end of the center tube;

Fig. 6 is a sectional view through a baffle plate adjacent the oil inlet;

Fig. 7 is a plan view of an anti-drain valve disc;

Fig. 8 is a horizontal sectional view through the part-flow filter cartridge and center tube; and Fig. 9 is a vertical sectional view through the upper part of the center tube.

Figure 3:
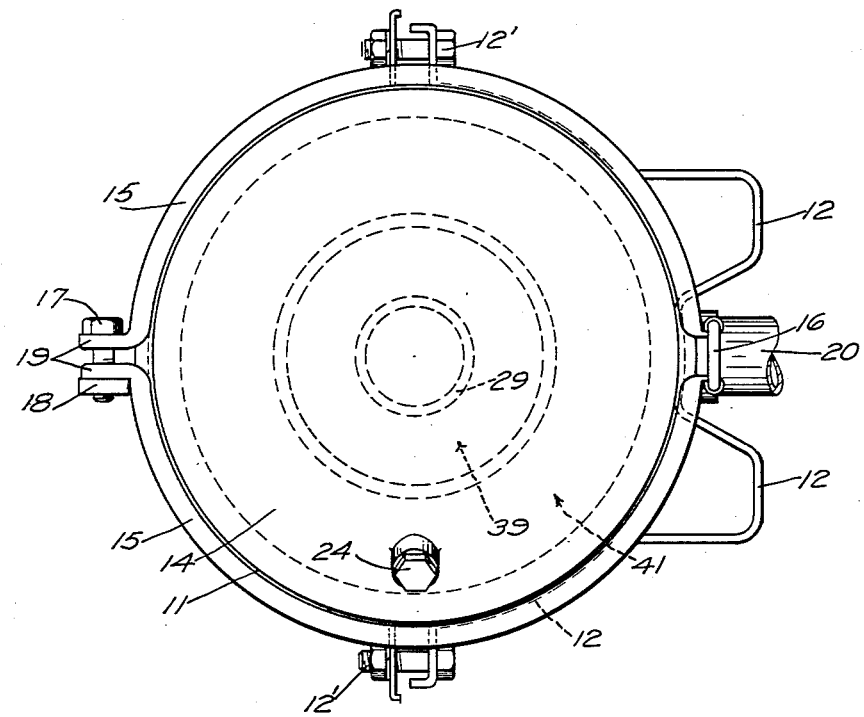
Fig. 3 is a top plan view of the filter of Fig. 1.

Referring first to Fig. 1 of the drawing, it will be seen that the filter shell or housing, designated by 10, is shown as supported by the clamping brackets 11 and 12 which are secured one to the other by the bolts 12'. The brackets 12 are bolted to the support 13, which may be mounted on or adjacent to the engine that is to be lubricated. The shell 10 has a removable cover 14 which is secured in sealing engagement with the shell 10 by the half-round clamps 15. These clamps each engage at one end, as best shown in Fig. 3, the link 16 and their other ends are secured to each other by the clamping bolt 17 and nut 18 which engage the ears 19. The oil to be filtered enters through the linet pipe 20 and that oil which has passed through the full-flow cartridge leaves the shell through the discharge pipe 21 on its way to the engine bearings. The oil which has passed through both filter cartridges leaves the shell through the pipe 22 to be returned to the crankcase. The filter shell is shown as having the removable plug 23 for removing dirt from the shell from time to time, and the cover 14 is shown as having the air vent plug 24 which can be removed when necessary to allow trapped air to escape from the shell.

Figure 2:
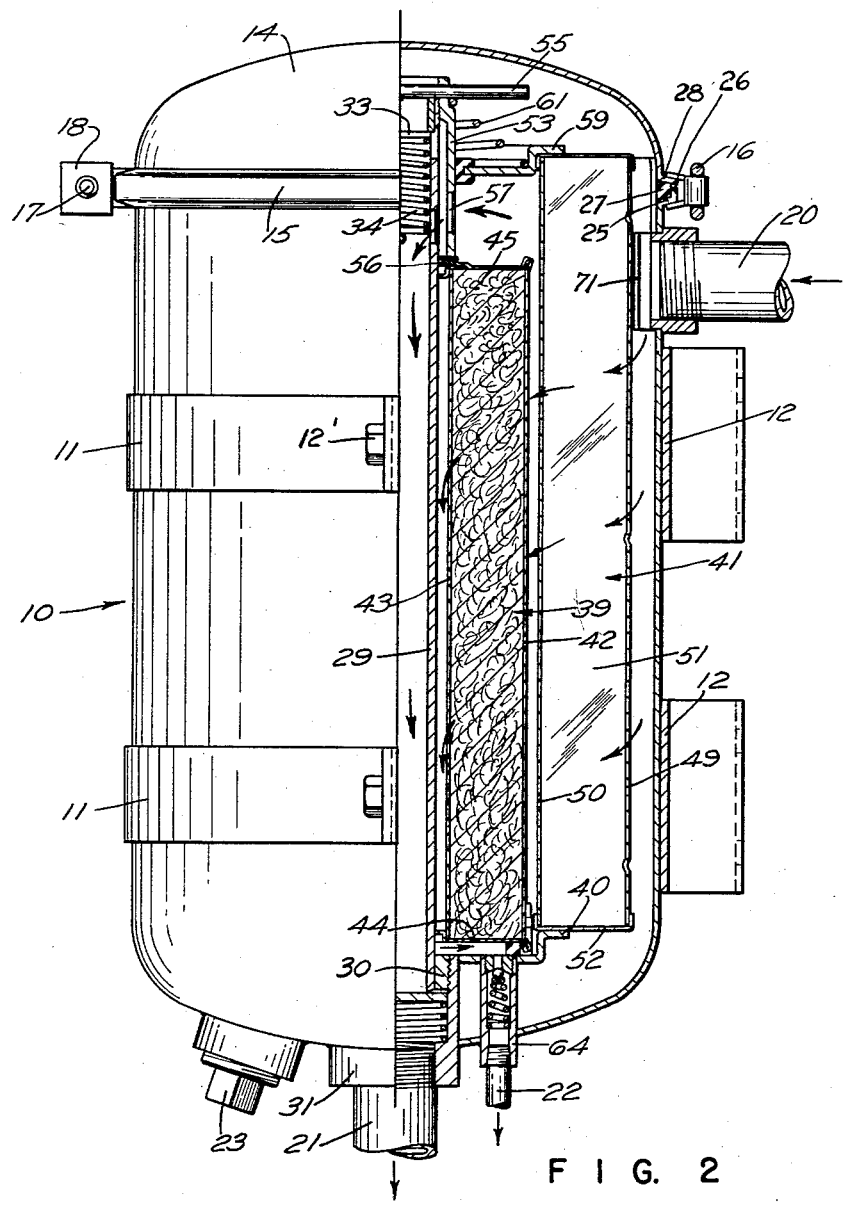
Fig. 2 is a similar view but shows the filter partly in section.

Now referring to the portion of the filter shown in section in Fig. 2 of the drawing, it will be noted that the body 10 of the filter shell is formed as a deeply drawn tube, preferably steel, which is dished at its bottom, and the cover 14 has a similar dished shape. The upper end of the body is flared outwardly, as indicated by 25, and has the outer rim 26 to receive the ring gasket 27, and the cover 14 has the outwardly extending flange 28. The arrangement is such that the flange portions 25 and 28 are embraced by the clamps 15, which are approximately U-shaped in cross section and serve to hold the cover firmly in place with a liquid-tight seal. The construction is such that the internal pressure of the oil against the gasket 27 will increase its sealing action.

Within the shell 10 is provided the filter center tube 29. This tube is provided at its lower end with the bushing 30 which is welded to the outer surface of the center tube, and the outer face of this bushing is threaded, as best shown in Fig. 4, so that it can be threadedly engaged with the threads formed inside of a bottom sleeve 31 which extends through an opening in the bottom of the shell and is welded to said shell so as to avoid oil leakage under high internal pressure. The upper end of the center tube 29 is counter bored, as best shown in Fig. 9, to receive a bushing 32 that is brazed in the bore of the tube. The purpose of this bushing is to cooperate with a disc valve 33 to form a relief valve at the upper end of the center tube. This disc valve is normally held in sealing engagement with the lower end of the bushing 32 by a coil spring 34, the lower end of which rests upon a pin 35 that extends transversely of the center tube and is snugly fitted in drill holes in the tube. The center tube is externally threaded at its upper end, as indicated at 36, and it is provided with the oil inlet holes 37 formed in its side walls at some distance from its upper end. The arrangement is such that the oil which has passed through the full-flow cartridge, to be described, will enter these holes 37 and pass downwardly within the center tube, as indicated by the arrows in Fig. 2, on its way to the engine bearings.

The bottom sleeve 31 threadedly receives the upper end of the discharge pipe 21, and it also serves as supporting means for the bottom plate 38 which has a central hole to receive a reduced portion at the upper end of this sleeve. The plate is rigidly secured to the upper end of this sleeve. The bottom plate 38 extends laterally outwardly to form a seat for the part-flow filter cartridge 39, and it has a raised annular outer flange 40 that forms a seat for the lower end of the full-flow cartridge 41, as will be apparent from Fig. 4.

The part-flow filter cartridge 39 is of cylindrical shape and has the outer perforated wall 42 and inner perforated wall 43; it also has the lower end plate 44 and upper end plate 45, and these end plates are rigidly secured to the outer wall 42 by a rolled seam. The inner tubular wall 43 snugly embraces an annular flange 46 upon each end plate. Within the cartridge walls just described is confined any suitable filtering material, such as the cotton waste 47. When this part-flow filter cartridge 39 is in operating position within the filter shell, its lower end plate 44 rests upon the sealing gasket 48 which preferably is adhesively secured to the end plate 44, and this gasket rests upon the bottom plate 38. The part-flow cartridge 39 is held in sealing engagement with the gasket 38 by clamping means to be described which exert a positive downward pressure upon the upper end of such cartridge.

The full-flow cartridge 41 is, as above stated, large enough to surround the part-flow cartridge, and this full-flow cartridge has a perforated outer cylinder wall 49 and a perforated inner wall 50. Between these cylinder walls is disposed the filter element such as pleated filter paper 51. The ends of such filter paper are closed by the end caps 52 which are secured firmly to the pleated paper by a suitable bonding agent, and these end caps are cupped slightly or have the laterally bent annular flanges that embrace the pleats near their ends. When the full-flow filter cartridge 41 is in its operating position, its lower end 52 rests firmly upon the supporting flange 40 of the bottom plate 38; and since this end 52 is formed of paper, it will form a satisfactory seal against the supporting element 40. A yielding downward pressure is exerted upon the outer cartridge 41 to hold the same seated upon the flange 40 by means which will now be described.

The center tube 29 is secured in the filter housing by engaging the external threads of the bushing 30 at the lower end of this tube with the internal threads near the upper end of the bottom sleeve 31, and the center tube is rotated to screw the same into the bottom sleeve. The upper end of the center tube, as above mentioned, is externally threaded as indicated at 36. The purpose of this is to receive the retainer sleeve 53, best shown in Fig. 5. This sleeve is internally threaded, as indicated by 54, to engage the threads 36 of the center tube. The retainer sleeve 53 can be screwed manually onto the center tube without the use of any tools since the upper portion of this retainer is provided with the transversely extending pin 55 which extends through holes formed near the upper end of the retainer. This pin may be grasped with the fingers to rotate the retainer and thereby screw it down onto the center tube until the lower end engages and presses downwardly on a gasket 56 secured to the outer face of the cartridge end cap 45. It is this downward pressure of the retainer on the part-flow cartridge that forms a seal at the upper end of this cartridge and causes the lower end of this cartridge to engage sealingly the gasket 48. The retainer 53 has formed through its side walls the oil inlet openings 57. The retainer sleeve 53 has mounted thereon the top plate 58 which has the raised outer annular flange 59. This top plate is slidably mounted upon the retainer sleeve and is provided with the gasket 60 that slides on such sleeve. The top plate 58 is urged in a downward direction by the coiled spring 61, the lower end of which rests upon the top plate 58 as shown, and the upper end of this spring embraces the upper portion of the retainer sleeve 53 and abuts against the transversely extending pin 55.

The top plate 58 is shown in Fig. 5 as disposed down near the lower end of the retainer 53 and as overlying the oil inlet holes 57. It is desired to point out that when the retainer sleeve is screwed onto the center tube to its operating position as shown in Fig. 2, the top plate 58, which sealingly engages the upper end of the full-flow cartridge, will at this time occupy a higher position upon the retainer sleeve. It should be noted that the top plate 58 is so formed that it will fit within the inner wall of the full-flow filter cartridge to center the same, and the outer flange 59 of this plate will be held in sealing engagement with the upper end 52 of this cartridge by the downward pressure of the spring 61. The bottom plate 38 has spot-welded thereto the centering ring 62 which serves to center the outer cartridge 41 as it is seated upon the portion 40 of this bottom plate.

When it is desired to provide the shell 10 with the full-flow and part-flow cartridges it is designed to receive, the cover 14 is removed by first removing the two half-round clamps 15 so that the cover may be lifted off of the shell. This can be done without disturbing the gasket 27 which is held in its proper position by the portions 25 and 26 of the shell housing. Assuming that the center tube has been firmly secured in place within the shell as above described, the part-flow cartridge is placed on this center tube and is pushed downwardly until its bottom gasket engages the bottom plate 38. As this is done the gasket 56 at the upper end of the cartridge 39 will sealingly embrace the outer wall of the center tube so that this gasket will cooperate with the lower gasket 48 to prevent the oil which surrounds the part-flow cartridge 39 from reaching the space about the center tube without passing first through the filtering media of this cartridge. As soon as the inner cartridge is seated upon the bottom plate, the full-flow cartridge 41 is moved downwardly about the inner cartridge until its lower end seats upon the flange 40 of the bottom plate. Next, the assembly sleeve 53 is screwed downwardly upon the center tube until its lower end presses firmly upon the gasket 56, and as this is done the top plate 58 will be engaged with and pressed firmly against the upper end of the full-flow cartridge by the action of the coil spring 61. This downward pressure of the spring 61 will prevent oil from by-passing the full-flow cartridge 41 at either end thereof.

Referring to Fig. 2, it will be understood that the oil supplied by the oil pump from the crankcase of the engine enters through the inlet pipe 20 to fill the interior of the shell 10. This oil will surround the full-flow outer cartridge 41 and will contact the upper face of the top plate 58 and the lower face of the bottom plate 38, as indicated by the arrows. The oil which passes through this full-flow cartridge will surround the part-flow cartridge 39 and most but not all of the oil that has passed through the outer cartridge will enter the holes 57 in the retainer 53 and pass downwardly inside of the center tube, as indicated by the arrows, to pass out of the discharge pipe 21 and on to the bearings to be lubricated. A small portion of the oil that has passed through the full-flow filter cartridge will pass also through the part-flow filter cartridge 39 to reach the space between the outer wall of the center tube and the inner wall 43 of the part-flow cartridge to move downwardly in this space, as indicated by the arrows in Fig. 2. Also, it is desired to point out that this oil will have been twice filtered since it passed through both cartridges. In order that the oil moving downwardly in the passage just mentioned may reach the space between the upper face of the bottom plate 38 and the lower face of the end plate 44, the end plate is provided with a central opening 63 of hexagon shape so that this opening will embrace the center tube 29 but permit oil to flow downwardly through the space provided by the corners of such hexagon opening. This twice-filtered oil, upon reaching the space immediately below the bottom plate 44, passes out of the shell 10 through a short pipe or tube 64 that passes through an off-center opening in the bottom of the shell, and this pipe is welded to such shell as shown in Fig. 4. The upper end of this tube extends into an opening in the bottom plate 38 and is rigidly secured thereto. The bore of this tube 64 is internally threaded adjacent its upper end to receive the valve seat member 65 which is provided with a small central passage that forms a metering hole. This hole controls the amount of oil that may escape from the shell and return directly to the oil sump through the discharge pipe 22.

Should the full-flow cartridge 41 become clogged with dirt through long usage, it is important that provision be made whereby oil can by-pass this cartridge and flow on to the engine bearings so as not to starve such bearings of oil. To take care of this situation the disc valve 33 above mentioned is provided near the upper end of the center tube, as best shown in Fig. 9. The tension of the spring 34 is such that this valve 33 will open only when a pre-determined hydraulic pressure, such as 18 to 20 pounds per square inch, is reached within the filter shell.

It is desirable that means be provided for preventing the oil from draining out of the filter shell 10 when the engine is not running. To accomplish this the bottom sleeve 31 has placed in its bore the flat disc valve 66, and this valve preferably has the construction best shown in Fig. 7 wherein it will be seen that the valve has the three equally spaced tabs 67. The purpose of these tabs is to contact the bore of the sleeve 31 to keep the disc valve centered in the sleeve and allow the oil which is released by this valve to flow around its outer periphery. The valve 66 normally is held seated against the lower end of the center tube 29 by a coiled spring 68. The pressure of this spring is very slight so that the valve 66 will open under a pressure of one or two pounds in order that the oil that has been filtered may pass readily to the engine bearings but will not drain out of the filter when the engine is idle.

It is desired also to provide anti-drain means for preventing the oil that has passed through both filter cartridges from returning to the crankcase through the pipe 22 when the engine is idle. To accomplish this the ball valve 69 is placed within the bore of the sleeve 64 so that it engages the valve seat 65, and it is normally held seated as shown in Fig. 4 by the pressure of a light spring 70.

Having described the various parts of the filter of the present invention, a brief description of its operation will now be given. The filter herein shown and described has been designed more particularly for use in large trucks and buses, the engines of which require a considerable flow of oil. The filter shell or housing 10 preferably has an overall length of approximately 16 inches and a diameter of about 8 inches, and it will operate under an internal pressure of 50 pounds or more per square inch. It is designated to have a flow rate of about 24 gallons per minute, and approximately nine-tenths (9/10) of this flow passes through the full-flow cartridge and one-tenth (1/10) through both the full-flow and by-pass cartridges.

The oil entering through the inlet pipe 20 preferably impinges against a baffle 71 which prevents it from coming in direct contact with the full-flow cartridge at this inlet. This oil completely surrounds the full-flow filter cartridge and under normal operating conditions will pass through the cartridge 41 to surround the part-flow inner cartridge 39. Should the outer cartridge become plugged due to long use without changing the same and the pressure within the shell become excessive, this pressure will be relieved by the by-pass valve 33. Most of the oil which passes through the cartridge 41 will find its way inside of the center tube through the openings 57 and 37 to flow downwardly within this tube, as indicated by the arrows. The small amount of oil that passes through the inner cartridge as well as the outer cartridge will reach the discharge sleeve 64 and return to the crankcase through the pipe 22.

When it is desired to change one or both cartridges within the filter, all that is necessary is to remove the clamping ring 15 and the cover 14. Then the retainer sleeve 53 can be unscrewed from the upper end of the center tube by grasping the laterally extending pin 55 and rotating the sleeve. This can be done by hand, thus eliminating the need of a wrench or other tool. It is desired to point out that the retainer assembly is housed entirely within the shell 10, as shown in Fig. 5, and that this assembly unit has no loose parts to become displaced or lost when the filter is being serviced. The filter shown will operate satisfactorily whether mounted in an upright, horizontal, or other position, and the by-pass valve 33 and anti-drain valves 66 and 69 will operate as above described when the filter is mounted in any position.

The flow through both cartridges is in the outside-in direction and the flow is in series through first one cartridge and then the other. The inner cartridge is centered about the center tube by the engagement of the hexagon walls of the lower end plate 44 and the gasket 56 of the upper end plate with this tube. The outer cartridge is centered by the lower centering ring 62 and the cupped portion of the top plate 58. The two cartridges do a highly efficient job in cleaning the oil supplied to the engine.

Having thus described my invention, what I claim and desire to protect by Letters Patent is:

A combined full-flow part-flow filter, comprising a shell having a removable cover, a liquid inlet leading into the shell, a center tube through which most of the liquid that enters the shell is discharged, a part-flow filter cartridge surrounding the center tube, and through which some oil normally flows, a full-flow filter cartridge surrounding the part-flow cartridge and through which all oil normally passes, a retainer sleeve within the shell having threaded engagement with an end of the center tube and adapted to exert a positive hold-down pressure on one cartridge and a yielding hold-down pressure on the other cartridge to accommodate variation in the height of the individual cartridges, and whereby when this sleeve is removed either cartridge can be replaced independently of the other cartridge, and means for discharging the liquid from the part-flow cartridge out of the shell.

References Cited in the file of this patent

UNITED STATES PATENTS

| | | |
|---|---|---|
| 2,612,270 | Lewis et al. | Sept. 30, 1952 |
| 2,747,744 | Gretzinger | May 29, 1956 |
| 2,801,006 | Hultgren et al. | July 30, 1957 |